S. GOEWEY.
Farm Gate.
No. 66,829.
Patented July 16, 1867.
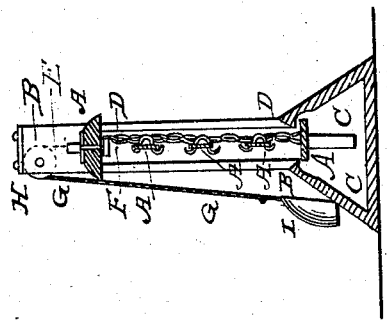
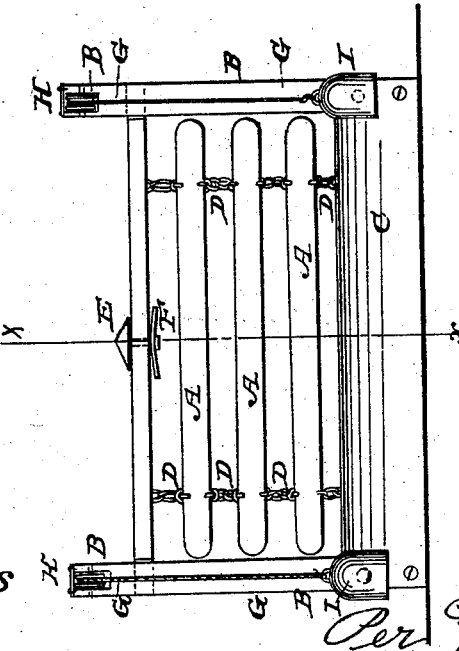

United States Patent Office.

SYLVESTER GOEWEY, OF DORMANSVILLE, NEW YORK.

Letters Patent No. 66,829, dated July 16, 1867.

---

IMPROVEMENT IN FARM-GATES.

---

*The Schedule referred to in these Letters Patent and making part of the same.*

---

TO ALL WHOM IT MAY CONCERN:

Be it known that I, SYLVESTER GOEWEY, of Dormansville, in the county of Albany, and State of New York, have invented a new and improved Farm-Gate; and I do hereby declare that the following is a full, clear, and exact description thereof, which will enable others skilled in the art to make and use the same, reference being had to the accompanying drawings, forming part of this specification, in which—

Figure 1 is a side view of my improved gate.

Figure 2 is a vertical cross-section of the same taken through the line $x\ x$, fig. 1.

Similar letters of reference indicate like parts.

My invention has for its object to furnish an improved self-closing gate, simple in construction, not liable to get out of order, and which, when opened or lowered, will be entirely out of the way; and it consists in the combination of horizontal bars connected to each other by chains or other flexible connections, slotted posts, cords, and weights, with each other, as hereinafter more fully described.

A are the horizontal bars of the gate, which may be of any desired number, and formed of any desired material. The upper and lower bars A, or all of them, if desired, are made with tenons upon their ends, which enter guide-slots in the posts B to keep them in proper relative position while the gate is being opened and closed. C is a recess formed at the lower part of the gate to receive the bars A when the gate is closed. The lower and upper bars should be made so wide that they cannot, while in a horizontal position, pass into or out of the recess C, and the upper one should be made strong enough to withstand the pressure of whatever may be passing through the gate. The bars A are connected to each other by chains D, or other flexible connections, so that they may readily fold together when the gate is lowered. E is a button, which is connected with a button, F, upon the lower side of the upper bar, which, when the gate is lowered, may be turned one-quarter around, bringing the ends of the button F into notches or catches formed in the sides of the recess C to hold the gate closed. G are ropes or chains, the ends of which are attached to the ends of the upper bar A, which pass over pulleys H pivoted in the upper parts of the posts B, and to their free ends are attached the weights I, which should weigh a few pounds more than the weight of the gate so as to slightly overbalance it. The recess C should be set in the ground so that its upper surface may be flush therewith. In opening or lowering a gate constructed in this way all that is necessary is to press upon the top bar of the gate slightly until all the bars A except the top one have entered the recess C; then, by turning the button E, the gate will be secured in that position. In raising or closing the gate all that is necessary is to turn the button E, releasing the gate, which will then rise and close itself.

I claim as new, and desire to secure by Letters Patent—

The combination of the horizontal bars A, connecting-chains D, or their equivalent, slotted posts B, ropes or chains G, and weights I with each other, substantially as herein shown and described and for the purpose set forth.

SYLVESTER GOEWEY.

Witnesses:
JOHN D. MYERS,
JACOB W. GOEWEY.